UNITED STATES PATENT OFFICE.

HARRY McLOUGHLIN, OF SAN FRANCISCO, CALIFORNIA, ASSIGNOR OF ONE-HALF TO FREDERICK DOUGLAS CARTHEW, OF SAN FRANCISCO, CALIFORNIA.

PROCESS OF OBTAINING MAGNESIA.

1,248,880.     Specification of Letters Patent.     Patented Dec. 4, 1917.

No Drawing.     Application filed February 9, 1916. Serial No. 77,240½.

*To all whom it may concern:*

Be it known that I, HARRY McLOUGHLIN, a citizen of the United States, residing at Number 1111 Pine street, in the city and county of San Francisco, State of California, have invented new and useful Improvements in the Process of Obtaining Magnesia, and of which the following is a specification.

Crude magnesite containing an excess of silica is crushed to approximately half inch pieces, is then placed in furnace and heated to approximately 500° C., or not to exceed 510° C., at which temperature approximately all of the $CO_2$ will be driven off, leaving magnesium oxid, associated with silica. The magnesium oxid has a specific gravity of about 3 to 3.6, while the silica has a specific gravity of approximately 2.2. This will then admit of sufficient difference to allow a separation being made either by currents of water or air, in accordance with the well known "classification" principle.

After leaving the kiln the materials are rapidly cooled, by being passed into a cooling chamber in which the temperature is kept very low, or preferably it may be cooled by immersion in water in which the difference of the contraction of the quartz and magnesium oxid by the cooling is utilized for disintegration of the lumps, thereby freeing the magnesia from the silica. The product is then passed into an agitator which by attrition of the particles will to a great extent further free the silicious particles from the magnesia. It is then passed over screens which screen out the coarser crystalline silica from the finer magnesia and from this the material passes to a series of grinders in which the material is pulverized to approximately 30 mesh. It is then subjected to elutriation in a current of air or water, when the silica existing either as quartz or magnesium silicate with a specific gravity of approximately 2.2 will be separated from the magnesium oxid having a specific gravity of 3 to 3.6. This leaves only a very small proportion of the silica (either free or as magnesium silicate) remaining in the magnesia product.

What I claim is:

The process substantially as herein described, of producing a relatively pure magnesium oxid from a magnesite containing silica, which comprises first calcining the material at a temperature sufficient to drive off substantially all the carbon dioxid, quenching the hot mass, whereby the magnesia is disintegrated, sieving out the coarse silica, grinding the residue to pass a 30 mesh screen, and finally subjecting the residue to regulated fluid currents of sufficient strength to carry away the material having a specific gravity of approximately 2.2 and of insufficient strength to carry away the material having a specific gravity of 3 or more.

HARRY McLOUGHLIN.

Witnesses:
WM. P. HUBBARD,
M. J. KLINGER.